(12) United States Patent
Shin et al.

(10) Patent No.: US 12,311,727 B2
(45) Date of Patent: May 27, 2025

(54) HEAT EXCHANGER FOR VEHICLES

(71) Applicant: ESTRA AUTOMOTIVE SYSTEMS CO., LTD., Daegu (KR)

(72) Inventors: Young Sam Shin, Daegu (KR); Jong Won Kim, Daegu (KR); Jun Ho Choi, Daegu (KR); Yeong Geun Jung, Daegu (KR)

(73) Assignee: ESTRA AUTOMOTIVE SYSTEMS CO., LTD., Daegu (KR)

( * ) Notice: Subject to any disclaimer, the term of this patent is extended or adjusted under 35 U.S.C. 154(b) by 330 days.

(21) Appl. No.: 17/787,021

(22) PCT Filed: Dec. 4, 2020

(86) PCT No.: PCT/KR2020/017610
§ 371 (c)(1),
(2) Date: Jun. 17, 2022

(87) PCT Pub. No.: WO2021/125642
PCT Pub. Date: Jun. 24, 2021

(65) Prior Publication Data
US 2023/0008587 A1    Jan. 12, 2023

(30) Foreign Application Priority Data
Dec. 18, 2019   (KR) .................. 10-2019-0169703

(51) Int. Cl.
*B60H 1/00*   (2006.01)
*B60H 1/32*   (2006.01)
(Continued)

(52) U.S. Cl.
CPC ..... *B60H 1/00328* (2013.01); *B60H 1/00342* (2013.01); *F25B 39/04* (2013.01);
(Continued)

(58) Field of Classification Search
CPC ............ B60H 1/00328; B60H 1/00342; B60H 1/3227; F25B 39/04; F25B 2339/047;
(Continued)

(56) References Cited

U.S. PATENT DOCUMENTS 7,469,554 B2 *  12/2008  Martins ................... F28D 9/005
                                                          62/506
8,122,736 B2 *   2/2012  Martins ................... F28D 9/005
                                                          62/507
(Continued)

FOREIGN PATENT DOCUMENTS

EP    3136034 A1 *  3/2017  ............... B60H 1/32
EP    3136034 B1 *  7/2018  ............... B60H 1/32
(Continued)

OTHER PUBLICATIONS

International Search Report for PCT/KR2020/017610, dated Mar. 5, 2021.

*Primary Examiner* — Ljiljana V. Ciric
(74) *Attorney, Agent, or Firm* — Sughrue Mion, PLLC (57) ABSTRACT

A heat exchanger for vehicles includes a condenser configured such that a coolant and a refrigerant perform heat exchange while flowing separately from each other, the coolant being formed by stacking of a plurality of first heat exchange plates; a gas-liquid separator for separating gaseous components from the refrigerant that has passed through the condenser; a supercooler configured such that the coolant having passed the condenser and the coolant having passed the gas-liquid separator perform heat exchange while flowing separately from each other, the supercoolder being formed by stacking a plurality of second heat exchange plates; and a connector that is interposed between the condenser and the supercooler and that forms a coolant passage allowing the coolant to flow from the condenser to the supercooler and a refrigerant passage (Continued)

allowing the refrigerant to flow from the condenser to the supercooler via the gas-liquid separator.

3 Claims, 6 Drawing Sheets

(51) Int. Cl.
    *F25B 39/04*     (2006.01)
    *F28D 9/00*     (2006.01)
    *F28D 21/00*     (2006.01)
    *F28F 3/04*     (2006.01)
    *F28F 9/02*     (2006.01)

(52) U.S. Cl.
    CPC ........... *F28D 9/005* (2013.01); *F28D 9/0093* (2013.01); *F28F 3/044* (2013.01); *F28F 9/0246* (2013.01); *B60H 1/3227* (2013.01); *F28D 2021/0084* (2013.01)

(58) Field of Classification Search
    CPC ................... F28D 9/005; F28D 9/0093; F28D 2021/0084; F28F 3/044; F28F 9/0246
    See application file for complete search history.

(56) References Cited

U.S. PATENT DOCUMENTS

| | | | |
|---|---|---|---|
| 10,337,808 B2 * | 7/2019 | Naitou | F25B 39/04 |
| 2016/0320141 A1 * | 11/2016 | Barfknecht | F28F 9/026 |
| 2017/0038151 A1 * | 2/2017 | Noda | F28F 9/0251 |
| 2019/0063800 A1 | 2/2019 | Rhee et al. | |
| 2023/0008587 A1 * | 1/2023 | Shin | F28F 3/044 |
| 2024/0151477 A1 * | 5/2024 | Shin | F28D 9/0075 |

FOREIGN PATENT DOCUMENTS

| | | | | |
|---|---|---|---|---|
| JP | 2015-210015 A | 11/2015 | | |
| KR | 20-0194067 Y1 | 9/2000 | | |
| KR | 10-2001-0059266 A | 7/2001 | | |
| KR | 10-2001-0059267 A | 7/2001 | | |
| KR | 10-2017-0079223 A | 7/2017 | | |
| KR | 10-1909658 B1 | 10/2018 | | |
| KR | 10-1909655 B1 | 12/2018 | | |
| KR | 10-2019-0023263 A | 3/2019 | | |
| KR | 10-2019-0143091 A | 12/2019 | | |
| KR | 10-2020-0011149 A | 2/2020 | | |
| KR | 10-2166920 B1 | 10/2020 | | |
| WO | WO-2021125642 A1 * | 6/2021 | | B60H 1/00328 |

* cited by examiner

HEAT EXCHANGER FOR VEHICLES

CROSS REFERENCE TO RELATED APPLICATIONS

This application is a National Stage of International Application No. PCT/KR2020/017610 filed Dec. 4, 2020, claiming priority based on Korean Patent Application No. 10-2019-0169703 filed Dec. 18, 2019.

TECHNICAL FIELD

The present invention relates to a heat exchanger for vehicles.

BACKGROUND ART

A water-cooled heat exchanger has been developed to replace an air-cooled heat exchanger of a vehicle that had been widely used in the past. The water-cooled heat exchanger is configured such that a refrigerant is condensed through heat exchange using coolant that is cooled by external air. A conventional water-cooled heat exchanger includes a condenser for first heat exchange between coolant and refrigerant, a gas-liquid separator for separating gas and liquid phase from the refrigerant that has passed through the condenser, a super-cooling unit for a second heat exchange between coolant having passed the condenser and refrigerant having passed the gas-liquid separator and a connector connecting the condenser, the gas-liquid separator and the super-cooling unit to form a flow path of the coolant and the refrigerant.

Such a conventional water-cooled heat exchanger has a problem in that productivity is reduced due to a large number of parts in the connection part, and compact packaging is difficult, and the product cost is increased due to a complicated assembly process.

PRIOR ART DOCUMENT

Korean Patent registration No. 10-1909655(2018 Oct. 12.)
Korean Patent registration No. 10-1909658(2018 Oct. 12.)

DETAILED DESCRIPTION OF THE INVENTION

Technical Object

An object of the present invention is to provide a water-cooled heat exchanger for a vehicle that enables compact packaging through simplification of parts and further improves productivity and reduces costs.

Technical Solution

According to an embodiment of the present invention, a heat exchanger for vehicles that cools and condenses refrigerant through heat exchange with coolant includes a condenser configured such that the coolant and the refrigerant performs heat exchange while flowing in a state separated from each other and being formed by a stacking of a plurality of first heat exchange plates; a gas-liquid separator for separating gaseous components from the refrigerant that has passed through the condenser; a supercooler configured such that the coolant having passed the condenser and the coolant having passed the gas-liquid separator performs heat exchange while flowing in a separated state from each other and being formed by a stacking of a plurality of second heat exchange plates; and a connector that is interposed between the condenser and the supercooler and forms a coolant passage allowing the coolant to flow from the condenser to the supercooler and a refrigerant passage allowing the refrigerant to flow from the condenser to the supercooler via the gas-liquid separator. The connector comprises a first intermediate plate and a second intermediate plate that are disposed in close contact with each other. The refrigerant passage comprises a refrigerant discharge passage and a refrigerant return passage that are respectively formed by at least one of a recessed groove that is provided in at least one of surfaces of the first intermediate plate and the second intermediate plate facing each other. The recessed groove is formed by a dam that is protruded from a surface of the first intermediate plate and the second intermediate plate.

The first and second intermediate plates may include an embossing structure provided on the surfaces facing each other.

The dam of the first and second intermediate plates and the embossing structure may have the same height.

Effect of the Invention

According to the present invention, the first and second intermediate plates of the connector can be formed as a mold product, thereby reducing manufacturing cost. In addition, the pressure resistance can be improved by applying an embossing structure to the first and second intermediate plates.

BEST MODE FOR CARRYING OUT THE INVENTION

An embodiment of the present invention will be described in detail with reference to the accompanying drawings.

A heat exchanger for a vehicle according to an embodiment of the present invention is a water-cooled heat exchanger for cooling refrigerant using cooling water. A heat exchanger may condense a high-temperature and high-pressure refrigerant into a medium-temperature and high-pressure refrigerant through heat exchange between coolant and refrigerant.

Figure 1:
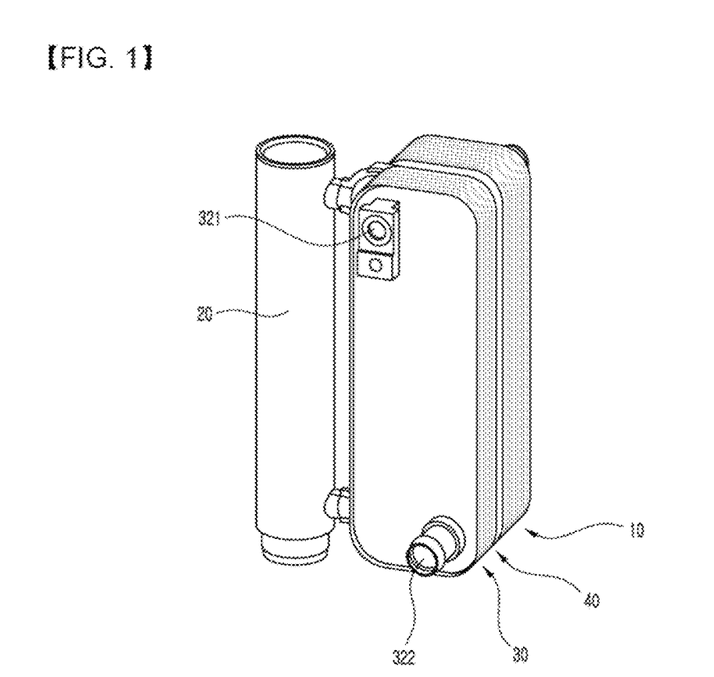
FIG. 1 is a perspective view of a heat exchanger for a vehicle according to an embodiment of the present invention.
Figure 2:
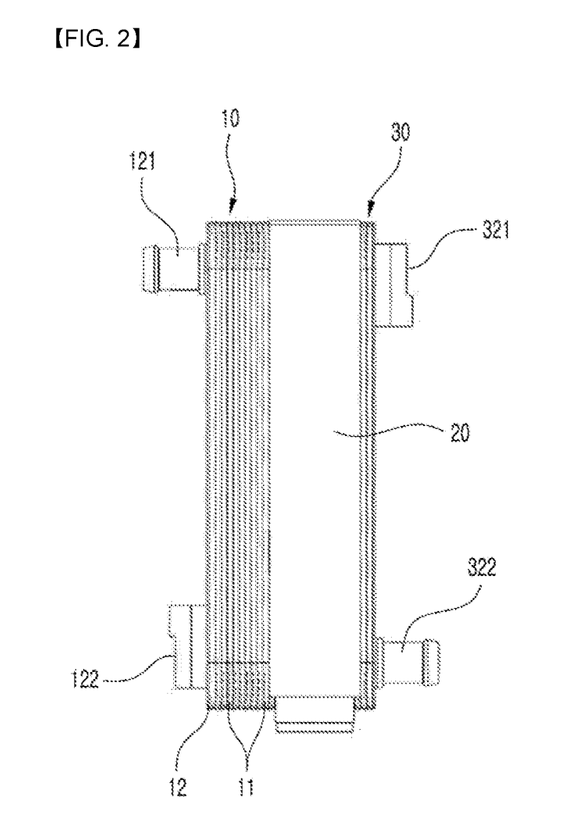
FIG. 2 is a side elevational view of a heat exchanger for a vehicle according to an embodiment of the present invention.
Figure 3:
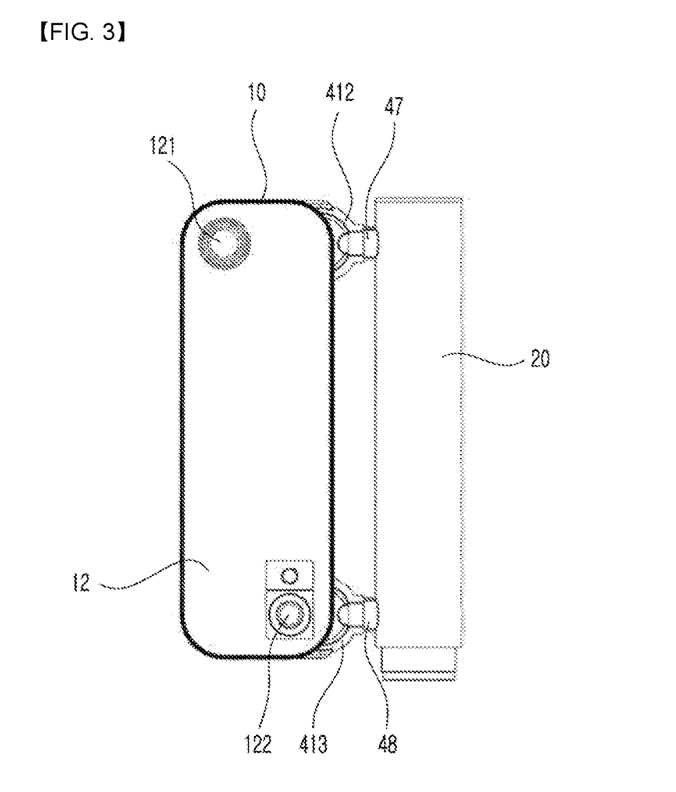
FIG. 3 is a rear elevational view of a heat exchanger for a vehicle according to an embodiment of the present invention.

Referring to FIG. 1 to FIG. 3, a condenser 10 and a supercooler 30 wherein heat exchange between coolant and refrigerant occurs are provided, and a gas-liquid separator 20 is used to separate gaseous components from the coolant cooled by the condenser 10. A connector 40 forms a coolant passage and a refrigerant passage between the condenser 10, the gas-liquid separator 20 and the supercooler 30.

The condenser 10 may be formed by stacking a plurality of heat exchange plates 11, and a cover plate 12 may be disposed outside the heat exchange plate 11 disposed at the outermost side. The coolant and the refrigerant are respectively introduced into and discharged from the condenser 10, and heat exchange is performed between the coolant and the refrigerant while the coolant and the refrigerant flow through the condenser 10. Specifically, the coolant flows into the condenser 10 through a coolant inlet 121 provided in the cover plate 12, flows while filling a predetermined space between the heat exchange plates 11, and is then discharged to the connector 40. Meanwhile, the refrigerant is introduced through a refrigerant inlet 122 provided in the cover plate 12, flows while filling a predetermined space between the heat exchange plates 11, and then is discharged to the connector 40. At this time, it is configured such that heat exchange between the coolant and the refrigerant occurs while the coolant and the refrigerant flows separately from each other. A plurality of separated spaces are formed between the stacked heat exchange plates 1, and the coolant and the refrigerant are alternately filled in the spaces to perform heat exchange.

Figure 4:
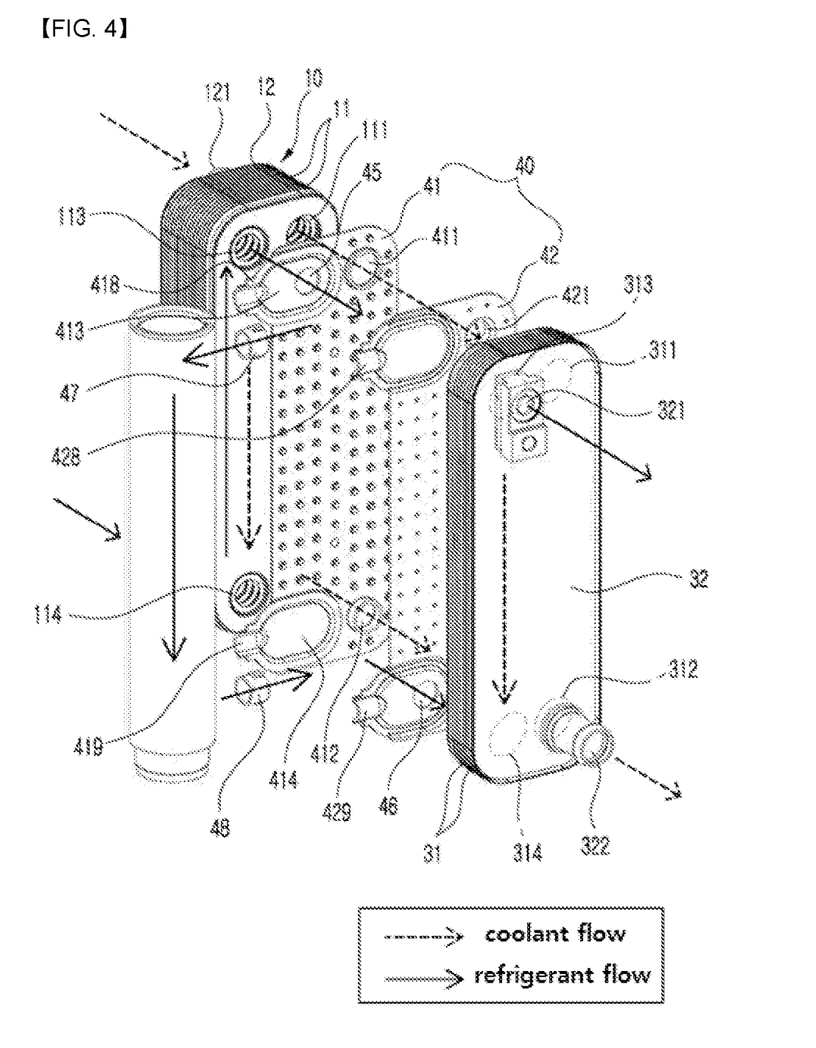
FIG. 4 is an exploded perspective view of a heat exchanger for a vehicle according to an embodiment of the present invention.

Referring to FIG. 4, the heat exchange plate 11 may include coolant moving holes 111 and 112 for movement of the coolant and refrigerant moving holes 113 and 114 for movement of the coolant. The coolant moving holes 1111 and 112 and the refrigerant moving holes 113 and 114 may be provided at an upper end portion and a lower end portion of the heat exchange plate 11, respectively. Referring to FIG. 2, the coolant inlet 121 may be formed at a position corresponding to the coolant moving hole 111, and the coolant moves through the coolant moving holes 111 and 112 while filling the coolant space between the heat exchange plates 11. The refrigerant inlet 122 may be provided at a position corresponding to the refrigerant moving hole 114 at the lower end portion of the cover plate 12, and the refrigerant flows into the refrigerant inlet 122 and moves through the refrigerant moving holes 113 and 114 while filling the refrigerant space between the heat exchange plates 11.

The coolant passing through the condenser 10 flows into the supercooler 30 via the connecting unit 40, and the refrigerant passing through the condenser 10 is supplied to the gas-liquid separator 20 via the connecting unit 40. The gas-liquid separator 20 separates gas phase components from the refrigerant passing through the condenser 10, and the refrigerant passing through the gas-liquid separator 20 is supplied to the supercooler 30 via the connector 40.

The supercooler 30 may be formed by stacking a plurality of heat exchange plates 31, and a cover plate 32 may be disposed outside the heat exchange plate 31 disposed at the outermost side. The coolant and the refrigerant are respectively introduced into and discharged from the supercooler 30, and heat exchange between the coolant and the refrigerant is performed while the coolant and the refrigerant flow through the supercooler 10. The heat exchange plates 31 may include coolant moving holes 311 and 312 for movement of the coolant supplied from the connector 40 and refrigerant moving holes 313 and 314 for movement of the refrigerant supplied from the connector 40. As shown in FIG. 4, the coolant moving holes 311 and 312 may be formed in the upper and lower end portions of the heat exchange plate 31, respectively, and the refrigerant moving holes 313 and 314 are also formed in the upper and lower end portions of the heat exchange plate 31, respectively. The coolant supplied from the connector 40 moves through the coolant moving holes 311 and 312 while filling the predetermined coolant space between the heat exchange plates 31 and is then discharged to the coolant outlet 322 provided in the cover plate 32. The refrigerant supplied from the connector 40 moves through the refrigerant moving holes 313 and 314 while filling the predetermined refrigerant space between the heat exchange plates 31 and is then discharged through the refrigerant outlet 321 provided in the cover plate 32. At this time, the coolant and the refrigerant are configured to exchange heat while flowing in a state separated from each other. A plurality of separated spaces are formed between the stacked plurality of heat exchange plates 31, and the coolant and the refrigerant are alternately filled in the plurality of spaces so as to perform heat exchange. Secondary heat exchange is performed between the coolant and the refrigerant in the supercooler 30.

The connector 40 is interposed between the condenser 10 and the supercooler 30. As shown in FIG. 1 to FIG. 4, the condenser 10 and the supercooler 30 have a structure in which a plurality of plates are stacked, and the connector 40 also has a plate structure and is interposed between the condenser 10 and the supercooler 30. The connector 40 forms a coolant passage that allows the coolant to flow from the condenser 10 to the supercooler 40 and a refrigerant passage that allows the refrigerant to flow from the condenser 10 to the supercooler 30 via the gas-liquid separator 20.

The connector 40 includes a first intermediate plate 41 and a second intermediate plate 42 that are disposed to be in close contact with each other. The first intermediate plate 41 and the second intermediate plate 42 may have substantially the same rectangular plate shape as the heat exchange plate 11 of the condenser 10 and the heat exchange plate 41 of the supercooler 40.

Figure 5:
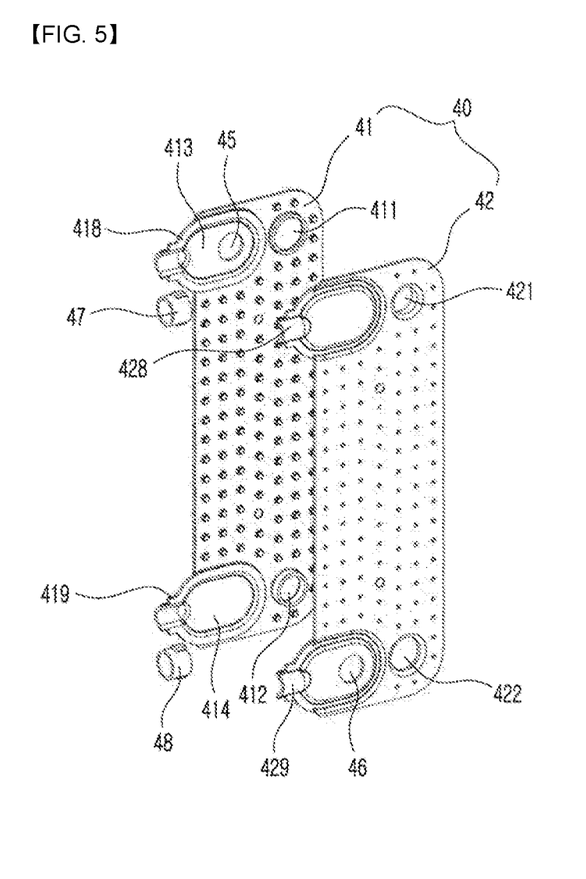
FIG. 5 is an exploded perspective view of a first intermediate plate and a second intermediate plate constituting a connection part of a heat exchanger for a vehicle according to an embodiment of the present invention.
Figure 6:
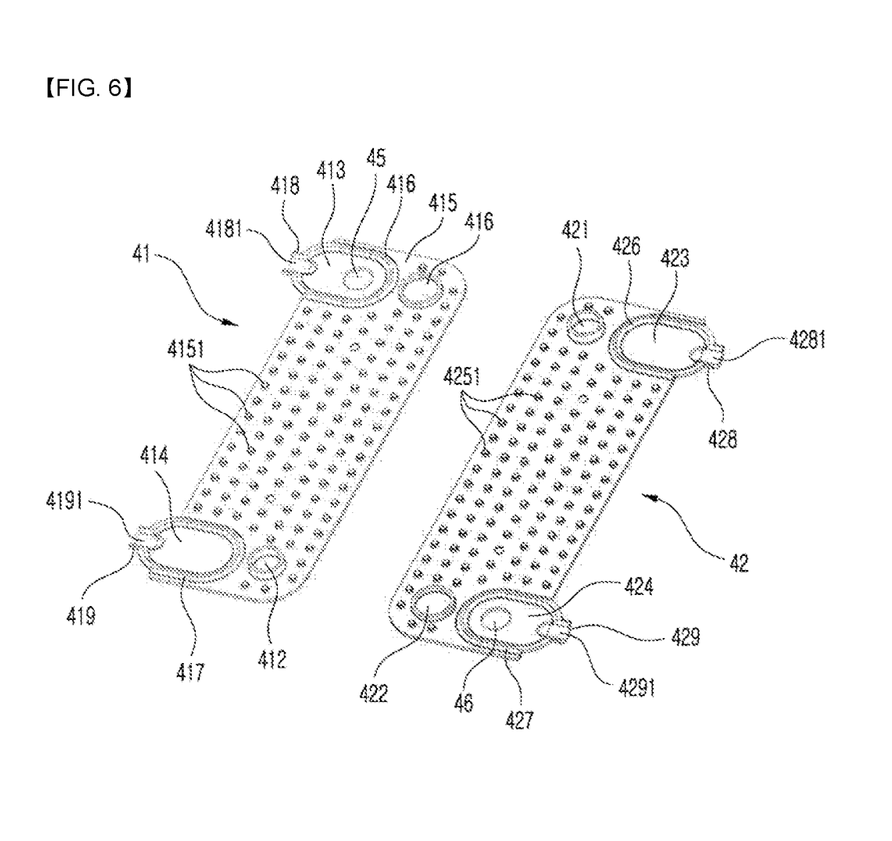
FIG. 6 is a perspective view showing an unfolded state of a first intermediate plate and a second intermediate plate constituting a connection part of a heat exchanger for a vehicle according to an embodiment of the present invention.

Referring to FIG. 5 and FIG. 6, the first intermediate plate 41 may include coolant holes 411 and 412 that are passages through which coolant flows, and the second intermediate plate 42 has coolant holes 421 and 422 that are passages through which coolant flows. The coolant holes 411 and 421 that are respectively formed in the upper portions of the first and second intermediate plates 41 and 42 may be formed at positions corresponding to each other and may be formed at positions corresponding to the coolant moving passage 111 of the condenser 10. Similarly, the coolant holes 412 and 422 that are respectively formed in the lower portions of the first and second intermediate plates 41 and 42 may be formed at positions corresponding to each other and may be formed at positions corresponding to the coolant passage 112 of the condenser 10. The combination of the two coolant holes 411 and 421 and the combination of the two coolant holes 412 and 422 form a coolant passage through which the coolant flows from the condenser 10 to the supercooler 30. At this time, when the first and second intermediate plates 41 and 42 are installed in a state in which they are in close contact, each part of the first and second intermediate plates 41 and 42 forming the coolant passage may be in close contact with each other or one part may also be inserted into the other part. For example, a boss-shaped protrusion for forming a coolant hole is provided on one of the first and second intermediate plates 41 and 42, respectively, and may be inserted into the coolant hole on the opposite side.

The first and second intermediate plates 41 and 42 that are in close contact with each other are configured to form both a passage for receiving the refrigerant from the condenser 10 and sending it to the gas-liquid separator 20 and a passage for again receiving the refrigerant from the gas-liquid separator 20 and sending it the supercooler 30. The first intermediate plate 41 forms a refrigerant inflowing hole 45 that is formed at a position corresponding to a refrigerant moving hole 113 provided at an upper portion of the condenser 10 and plays a role of a passage through which the coolant inflows, and the second intermediate plate 42 forms a refrigerant discharging hole 46 that is formed at a position corresponding to a refrigerant moving hole 314 provided at a lower portion of the supercooler 30 and play a role of a passage through which the refrigerant discharges. A refrigerant discharge passage and a refrigerant return passage are formed by the first and second intermediate plates 41 and 42 in close contact with each other. The refrigerant discharge passage may be formed by discharge recessed grooves 413 and 423 provided in at least one of the surfaces facing each other of the first and second intermediate plates 41 and 42, and the refrigerant return passage may be formed by return recessed grooves 414 and 424 provided in at least one of the surfaces facing each other of the first and second intermediate plates 41 and 42.

The discharge recessed groove 413 may be formed as a space surrounded by a dam 416 protruding from a surface 415 of the first intermediate plate 41. Similarly, the discharge recessed groove 423 may be formed as a space surrounded by a dam 426 protruding from a surface 425 of the second intermediate plate 42. At this time, rear surfaces of the dams 416 and 426 may be recessed. Discharge branches 418 and 428 protruding toward the gas-liquid separator 20 may be provided at the upper ends of the first and second intermediate plates 41 and 42, and discharge passages 4181 and 4281 formed in the discharge branches 418 and 428 may be respectively communicated to the discharge recessed grooves 413 and 423. Referring to FIG. 4, a connector 47 may be coupled to the gas-liquid separator 20 by being fastened to the discharge branches 418 and 428.

The return recessed groove 414 may be formed as a space surrounded by a dam 417 protruding from a surface 415 of the first intermediate plate 41. Similarly, the return recessed groove 424 may be formed as a space surrounded by a dam 427 protruding from a surface 425 of the second intermediate plate 42. At this time, rear surfaces of the dams 417 and 427 may be recessed. Discharge branches 419 and 429 protruding toward the gas-liquid separator 20 may be provided at the lower ends of the first and second intermediate plates 41 and 42, and return passages 4191 and 4291 formed in the return branches 419 and 429 may be respectively communicated to the return recessed grooves 414 and 424. Referring to FIG. 4, a connector 48 may be coupled to the gas-liquid separator 20 by being fastened to the return branches 419 and 429.

The first and second intermediate plates 41 and 42 having the structure as described above may be manufactured as a mold product rather than by mechanical metal processing. The condenser 10, the supercooler 30, and the connecting unit 40 may be coupled to each other through brazing.

Meanwhile, in order to improve the pressure resistance of the heat exchanger having a stacking structure, embossing structures 4151 and 4251 are provided on the surfaces 415 and 425 of the first and second intermediate plates 41 and 42 facing each other. The embossing structures 4151 and 4251 may be implemented with a plurality of protrusions protruding from the surfaces 415 and 425 of the first and second intermediate plates 41 and 42. In a state in which the first and second intermediate plates 41 and 42 are installed to be in close contact with each other, the embossing structures 4151 and 4251 are in close contact with each other. Since the first and second intermediate plates 41 and 42 are supported by each other by the embossing structures 4151 and 4251, the pressure resistance of the heat exchanger may be improved. At this time, the dams 416 and 417 of the first intermediate plate 41 and the embossing structure 4151 may have the same height, and the dams 426 and 427 of the second intermediate plate 42 and the embossing structure 4251 may also have the same height.

The flow of the coolant is indicated by dotted arrows in FIG. 4. Referring to FIG. 4, the coolant is introduced through the coolant inlet 121 provided in the cover plate 12 of the condenser 10, and the introduced coolant fills the coolant spaces while flowing through the coolant moving holes 111 of the first heat exchange plates 11. At this time, the coolant moving downward moves through the coolant moving holes 112 formed in the lower portion of the first heat exchange plates 11. The coolant passing through the condenser 10 is supplied to the supercooler 30 through the coolant holes 411 and 412 of the first and second intermediate plates 41 and 42 of the connecting unit 40. Then, the coolant fills the coolant spaces of the supercooler 30 while moving through the coolant moving holes 311 and 312 and is then discharged through the coolant outlet 322 provided in the cover plate 32.

Meanwhile, the flow of the refrigerant is indicated by a solid arrow in FIG. 4. Referring to FIG. 4, the refrigerant is introduced through the refrigerant inlet 122 provided in the cover plate 12 of the condenser 10, and the introduced refrigerant filles the refrigerant spaces while flowing through the refrigerant moving holes 113 and 114 of the first heat exchange plates 11. Then, the refrigerant flows into the refrigerant inlet hole 45 of the connector 40 through the refrigerant moving hole 113 provided at the upper portion of the first heat exchange plate 11. Then, the refrigerant is discharged to the gas-liquid separator 20 through the refrigerant inlet hole 45 and the recessed grooves 413 and 423, and the refrigerant moves downward in the gas-liquid separator 20 and is then returned to the connector 40 through the recessed grooves 414 and 424. Then, the refrigerant is supplied to the supercooler 30 through the refrigerant discharge hole 46 and is discharged through refrigerant outlet 321 provided in the cover plate 32 after filing the refrigerant spaces while moving through the refrigerant moving holes 313 and 314.

According to the present invention, since the connector is formed by the combination of the two plates and, in particular, passages for the coolant and the refrigerant is formed by the recessed grooves, the number of parts can be reduced and compact packaging can be realized. Furthermore, the first and second intermediate plates constituting the connector may be manufactured as a mold product, thereby reducing manufacturing cost.

Although preferred embodiments of the present invention have been described in detail above, the scope of the present invention is not limited thereto, and various modifications and improvements by those skilled in the art using the basic concept of the present invention as defined in the following claims are also within the scope of the invention.

INDUSTRIAL APPLICABILITY

The present invention relates to a heat exchanger that is applicable to vehicles, so it has an industrial applicability.

The invention claimed is:

1. A heat exchanger for vehicles configured to cool and condense a refrigerant through heat exchange with a coolant, comprising,
 a condenser configured such that the coolant and the refrigerant perform heat exchange while flowing separately from each other, the condenser being formed by stacking a plurality of first heat exchange plates;
 a gas-liquid separator configured to separate gaseous components from the refrigerant that has passed through the condenser;
 a supercooler configured such that the coolant having passed the condenser and the coolant having passed the gas-liquid separator perform heat exchange while flowing in separately from each other, the supercooler being formed by stacking a plurality of second heat exchange plates; and
 a connector that is interposed between the condenser and the supercooler and that forms a coolant passage allowing the coolant to flow from the condenser to the supercooler and a refrigerant passage allowing the refrigerant to flow from the condenser to the supercooler via the gas-liquid separator,
 wherein the connector comprises a first intermediate plate and a second intermediate plate that are disposed in contact with each other,
 wherein the refrigerant passage comprises a refrigerant discharge passage and a refrigerant return passage that are respectively formed by a recessed groove that is provided in at least one of a first surface of the first intermediate plate and a second surface of the second intermediate plate facing each other, and
 wherein the recessed groove is formed by a dam that protrudes from the at least one of the first surface and the second surface,
 wherein the first surface comprises a first embossed structure inside four side edges of the first surface, and the second surface comprises a second embossed structure inside four side edges of the second surface, and
 wherein the first embossed structure and the second embossed structure are in contact with each other.

2. The heat exchanger for vehicles of claim 1, wherein each of the first embossed structure and the second embossed structure comprises a plurality of protrusions.

3. The heat exchanger for vehicles of claim 1, wherein the dam and the first embossed structure or the second embossed structure have the same height.

* * * * *